United States Patent [19]

Yamada

[11] Patent Number: 4,959,651
[45] Date of Patent: Sep. 25, 1990

[54] TEMPERATURE DETECTION METHOD AND APPARATUS

[75] Inventor: Tetsuro Yamada, Ibaraki, Japan

[73] Assignee: Kabushiki Kaisha Toshiba, Kawasaki, Japan

[21] Appl. No.: 200,893

[22] Filed: Jun. 1, 1988

[30] Foreign Application Priority Data

Aug. 5, 1987 [JP] Japan .................. 62-195899

[51] Int. Cl.⁵ ............................ H03M 1/20
[52] U.S. Cl. ................. 341/131; 341/118; 341/155
[58] Field of Search ........... 341/118, 119, 131, 132, 341/139, 148, 153, 154, 156, 158, 159, 160; 364/557, 571.01; 340/501; 324/105, 65 R, 115; 374/172

[56] References Cited

U.S. PATENT DOCUMENTS 4,216,675 8/1980 Nagata et al. .............. 73/362 AR
4,575,806 3/1986 Aldrich et al. ............... 340/501

FOREIGN PATENT DOCUMENTS 1451545 10/1976 United Kingdom .

OTHER PUBLICATIONS

User's Manual of TLCS-42,47,470, published by Toshiba Corp., publication date: Apr., 1986.

Primary Examiner—William M. Shoop, Jr.
Assistant Examiner—Brian K. Young
Attorney, Agent, or Firm—Cushman, Darby & Cushman

[57] ABSTRACT

A temperature detector including a temperature sensor to generate an analog voltage corresponding to a temperature detected thereby. The temperature detector is provided with an A/D conversion device to generate digital temperature data corresponding to the analog voltage input thereto, a reference voltage range setting device to set the reference voltage range to the A/D conversion device, and a reference voltage range changing device. The A/D conversion device compares the analog voltage with the reference voltage which varies within the set reference voltage range. The reference voltage range is automatically changed by the reference voltage range changing device not only to obtain a desired resolution of temperature in a normal operating mode, but also to detect a malfunction of the temperature sensor in a malfunction detection mode.

9 Claims, 2 Drawing Sheets

TEMPERATURE DETECTION METHOD AND APPARATUS

BACKGROUND OF THE INVENTION

1. Field of the Invention

The present invention relates, in general, to temperature detectors. More particularly, the invention relates to temperature detectors including A/D converters.

2. Description of the Prior Art

A temperature detector is known which outputs a digital signal to a control device, such as a microcomputer, in accordance with a temperature detected by a temperature sensor. The temperature detector includes an A/D converter to convert an analog signal corresponding to the temperature into the digital signal. An example of such an A/D converter is disclosed in the user's manual of TLCS-42,47,470 published by TOSHIBA CORP. in Mar., 1986. In this user's manual, an A/D converter has input terminals $V_{AREF}$ and $V_{ASS}$ across which the reference analog voltage is applied, and an analog input terminal AIN to which the analog voltage to be converted is applied. The A/D converter also includes resistors connected in a ladder arrangement and a comparator. The reference analog voltage is divided into a voltage value corresponding to one bit by the ladder resistors. A/D conversion is performed with the comparator comparing the input analog voltage with the divided voltage value sequentially.

A conventional temperature detector including the A/D converter will be explained referring to FIG. 2.

The A/D converter 3 includes circuit 5 fabricated as an IC. The voltage applied to an analog voltage input terminal AIN is input to an inverting input terminal (−) of comparator 7. A voltage dividing circuit 9 includes two hundred and fifty-seven resistors connected in series. The two ends of voltage dividing circuit 9 are connected to reference voltage input terminals $V_{AREF}$ and $V_{ASS}$, respectively. The voltage at each voltage division point of voltage dividing circuit 9 is input into the analog input terminal of one of two hundred and fifty-six analog switches, respectively, together forming a switch group 11. The analog output terminals of these analog switches are mutually connected and further connected to a non-inverting input terminal (+) of comparator 7. A decoder 13 produces a high level output on one of its two hundred and fifty-six output terminals (labeled OUT255 to OUT0) in accordance with an eight-bit digital signal that is applied to input terminals IN7 to IN0. The output from each of terminals OUT255 to OUT0 of decoder 13 is applied to the digital input terminal of one of the analog switches, respectively. An eight-bit binary counter 15 starts to count in synchronism with a clock signal 17 which is input to a clock input terminal CLOCK thereof from a clock terminal CLK of A/D converter 3. Counter 15 is reset by a leading edge of a start signal 19 which is input to a start-counting terminal START thereof from a start-conversion terminal STC of A/D converter 3. An eight-bit count signal 21, which is output from output terminals OUT7 to OUT0, is incremented in synchronism with clock signal 17.

When a stop signal 23 input into a stop-count terminal STOP becomes high, counter 15 stops counting, and count signal 21 at this time is latched. The stop signal 23 is provided by the output of comparator 7 and is input to the stop-count terminal STOP of counter 15. The stop signal 23 is also output from an end-conversion terminal EDC of A/D converter 3. The eight-bit count signal 21 from counter 15 is applied to input terminals IN7 to IN0 of decoder 13, and is also output, as parallel data, from output terminals DATA 7 to DATA 0 of A/D converter 3. Resistors 25, 27 and 29 are externally connected to integrated circuit 5 of A/D converter 3. Resistor 25 is connected between the two reference voltage input terminals $V_{AREF}$ and $V_{ASS}$. The reference voltage input terminal $V_{AREF}$ is connected to a DC power supply Vc through resistor 27. The reference voltage input terminal $V_{ASS}$ is connected to ground through resistor 29.

When start signal 19 applies a rising edge to counter 15, the count of counter 15 is reset, and then counter 15 starts to count in synchronism with clock signal 17, and eight-bit count signal 21 is successively incremented. Decoder 13 makes respective output terminal voltages thereof successively high in accordance with count signal 21. For example, when count signal 21 is zero, only output terminal OUT0 is made high, and when count signal 21 is one, only output terminal OUT1 is made high. Consequently, the analog switches of switch group 11 are successively closed, one at a time, causing the voltage which is input to the non-inverting input terminal (+) of comparator 7 to be progressively increased in a stepwise manner from a value which is practically equal to the voltage applied to the reference voltage input terminal $V_{ASS}$ towards a value which is practically equal to the voltage applied at the reference voltage input terminal $V_{AREF}$. When the stepwise voltage input to the non-inverting input terminal (+) of comparator 7 becomes larger than the voltage which is applied to the analog voltage input terminal (−) of comparator 7, the output of comparator 7 is inverted from a low level to a high level. When the output of comparator 7, i.e., stop signal 23 becomes a high level, counter 15 ceases counting and count signal 21 at this time is latched. Since the output of comparator 7 is also given to the end-conversion terminal EOC, the voltage of EOC also becomes a high level, and the termination of A/D conversion is thereby detected. Count signal 21 latched at this time is output from the data output terminals DATA 7 to DATA 0 as an eight-bit digital signal, whose value corresponds to the analog voltage which is applied to the input terminal AIN.

When A/D converter 3 is used in the temperature detector of, for example, a refrigerator, the analog voltage input terminal AIN is connected to a connection point of a temperature sensor 31 and a resistor 33. Temperature sensor 31 is provided in a freezer compartment of the refrigerator and may consist of a thermistor having a negative temperature characteristic. The other ends of temperature sensor 31 and resistor 33 are connected to the DC power supply Vc and ground, respectively. As the temperature detector of a refrigerator, the circuit must respond to temperatures around −20° C. in the freezer compartment. The temperature resolution of about 0.1° C. is also required in the A/D conversion. Therefore, conventionally, a temperature in a range having a width of twenty degrees from −30° C. to −10° C. is converted to eight-bit digital data so that the temperature resolution of about 0.08° C. can be realized. The temperature in the freezer compartment, which is detected by temperature sensor 31, is converted to the voltage Vth at the connection point of temperature sensor 31 and resistor 33, and the converted voltage Vth is input to the terminal AIN. Therefore, for example, when the DC power supply Vc is 5.0 volts, the temperature in the range having a width of twenty degrees from $-30°$ C. to $-10°$ C. is converted to the voltage Vth which can range from 1.5 volts to 4.0 volts. The resistance of resistors 25, 27 and 29 are, therefore, determined so as to provide respective voltages of 4.0 volts and 1.5 volts to be applied to the two reference voltage input terminals $V_{AREF}$ and $V_{ASS}$. Since the voltage Vth is then converted to the eight-bit digital data in the range from 1.5 volts to 4.0 volts, the resolution for this voltage Vth is about 10 millivolts corresponding to $0.08°$ C.

In the conventional temperature detector mentioned above, since the voltage applied to the two reference voltage input terminals $V_{AREF}$ and $V_{ASS}$ is simply determined by the voltage dividing circuit consisting of resistors 25, 27 and 29, the input voltage range for which A/D conversion is possible is fixed. Consequently, in order to achieve the required resolution with a small bit number, the voltages applied to the two reference voltage input terminals have to be restricted. So, it is not possible to detect malfunctions of temperature sensor 31, such as short circuiting or open circuiting, which causes the voltage of the terminal AIN to be DC power supply voltage or zero.

SUMMARY OF THE INVENTION

It is an object of the present invention to select the range over which a temperature detector may operate to achieve a desired resolution of temperature.

To accomplish the object described above, the present invention provides a temperature detection method and apparatus. An A/D conversion device generates a digital temperature data. A reference voltage range setting device sets the reference voltage range for the A/D conversion device. A reference voltage range changing device is also provided. An analog voltage corresponding to a temperature detected by a temperature sensor is applied to the A/D conversion device. The A/D conversion device compares the analog voltage, which varies within the set reference voltage range, with the reference voltage range. The reference voltage range changing device shifts the set reference voltage range to another reference voltage range.

BRIEF DESCRIPTION OF THE DRAWINGS

The present invention is best understood with reference to accompanying drawings in which.

DETAILED DESCRIPTION OF THE PREFERRED EMBODIMENT

Referring to the accompanying drawings, an embodiment of the present invention will be described.

Figure 1:
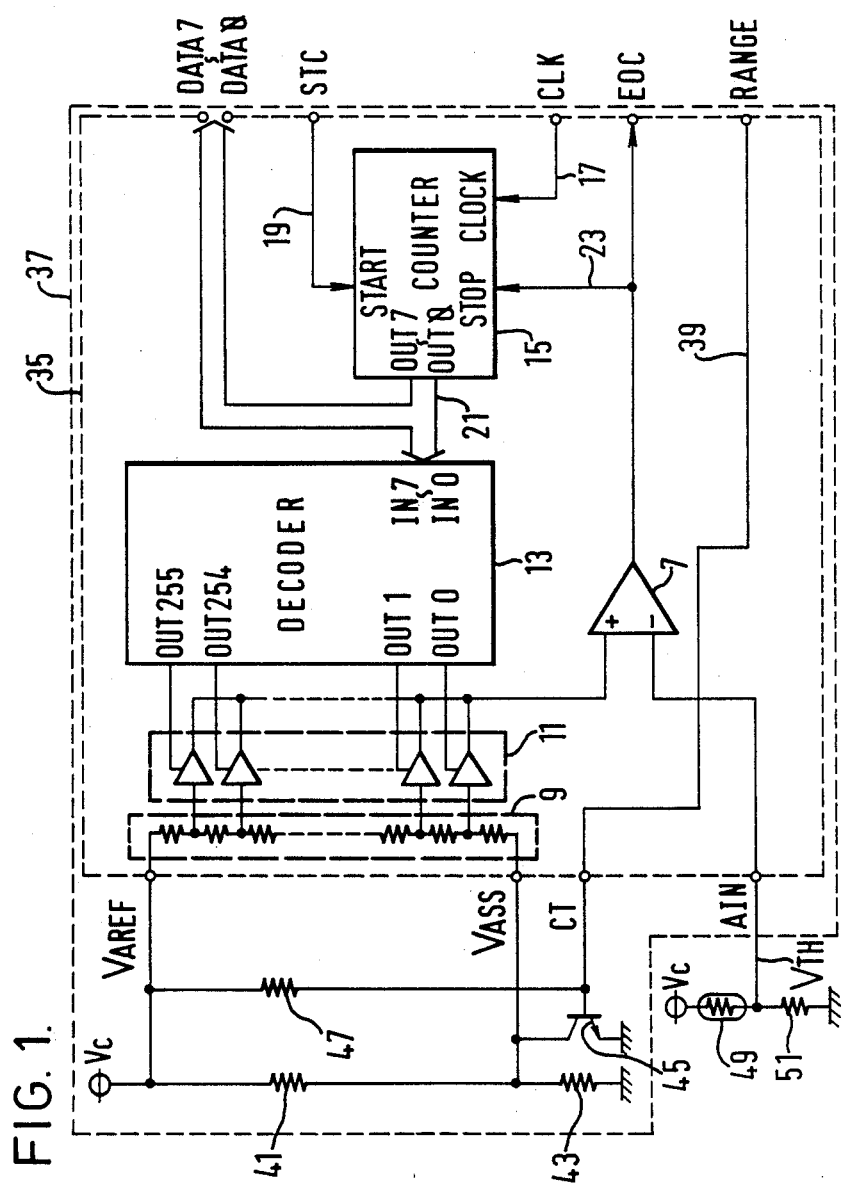
FIG. 1 is a schematic circuit diagram illustrating one embodiment of the present invention.
Figure 2:
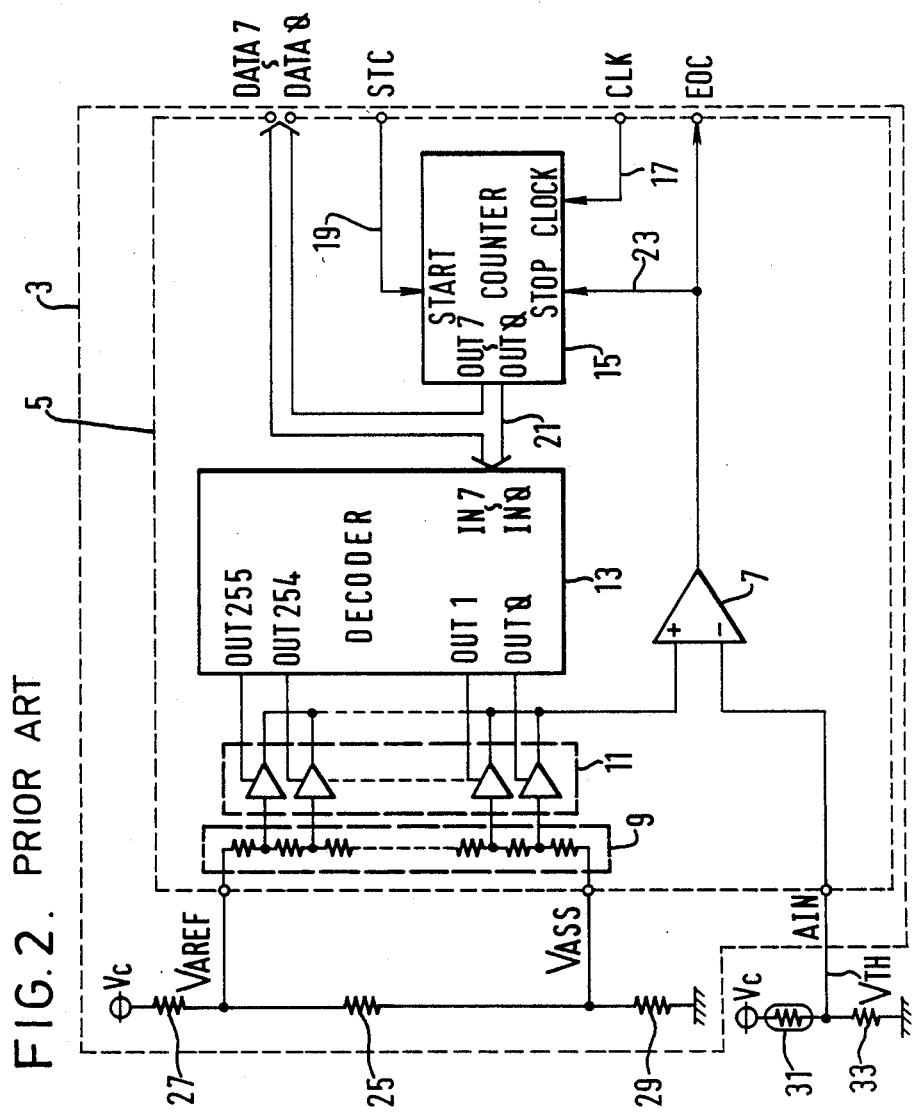
FIG. 2 is a schematic circuit diagram illustrating a prior art temperature detector.

Circuit 35 of an A/D converter 37 includes the same construction as integrated circuit 5 of A/D converter 3 shown in FIG. 2, with the exception that integrated circuit 35 has an input voltage range changeover terminal RANGE and a control terminal CT in addition. A changeover signal 39 from a microcomputer (not shown) is input to the terminal RANGE and is output from the terminal CT. A more detailed description of integrated circuit 35 and the action thereof will therefore be omitted as redundant.

The reference voltage input terminal $V_{AREF}$ of integrated circuit 35 is connected to the DC power supply Vc. An externally connected resistor 41 is connected between the two reference voltage input terminals $V_{AREF}$ and $V_{ASS}$. The reference voltage input terminal $V_{ASS}$ is connected to ground through a resistor 43. An NPN transistor 45 is connected parallel with resistor 43 with the collector thereof being connected to the terminal $V_{ASS}$, while the emitter thereof is connected to ground. The base of transistor 45 is connected to control terminal CT of integrated circuit 35 and is also pulled up to DC power supply Vc through a pullup resistor 47.

When this A/D converter 37 is used for the temperature detector of a refrigerator, a temperature sensor 49 is connected thereto. In other words, temperature sensor 49 is connected between the DC power supply Vc and ground through a resistor 51, and the junction between temperature sensor 49 and resistor 51 is connected to the analog voltage input terminal AIN of integrated circuit 35. Temperature sensor 49 consists of a well-known thermistor which has a negative temperature characteristic and detects the temperature in a freezer compartment of a refrigerator (not shown). As a result of the temperature characteristic of temperature sensor 49, the voltage Vth of the junction changes in accordance with the temperature in the freezer compartment, which is detected by temperature sensor 49. The resistance of resistor 51 is determined such that the voltage Vth changes within an appropriate range in accordance with the temperature to be set for the freezer compartment. In this embodiment, when a DC power supply Vc is 5.0 volts, the resistance of resistor 51 is determined such that the voltage Vth is 1.5 volts when the freezer temperature is $-30°$ C., the voltage Vth is 4.0 volts when the freezer temperature is $-10°$ C., and the voltage Vth is 2.0 volts when the freezer temperature is $-26°$ C. In other words, the resistance of resistor 51 is determined such that the voltage Vth rises one volt higher as the temperature rises eight degrees higher.

The resistances of resistors 41 and 43 are determined such that when transistor 45 turns OFF, the voltage applied to the reference voltage input terminal $V_{ASS}$ is 2.0 volts. Consequently, when a low-level changeover signal 39 is applied to the base of transistor 45 to turn transistor 45 OFF, the analog input voltage range for which A/D conversion is possible becomes from 2.0 volts to 5.0 volts, i.e., a width of 3.0 volts. Therefore, the resolution of the eight-bit A/D conversion for the voltage Vth applied to the terminal AIN is about 12.0 millivolts, corresponding to $0.096°$ C. So, the temperature resolution of about $0.1°$ C., which is required in the temperature detector of the refrigerator, can be achieved. Furthermore, a temperature in a range including $-20°$ C., which is a typical desired temperature for a freezer compartment, can be converted into a digital value.

If a continuity failure of temperature sensor 49 occurs, the voltage Vth of the junction point becomes the same high voltage as the DC power supply, i.e., 5.0 volts. If a disconnection failure of temperature sensor 49 occurs, the voltage Vth becomes 0 volts. However, if transistor 45 is turned ON in response to a high level changeover signal 39, the analog input voltage range for which A/D conversion is possible becomes from 0 volts to 5.0 volts, i.e., a width of 5.0 volts. Consequently, continuity failures and disconnection failures of temperature sensor 49 can be detected. The voltage of changeover signal 39 can be made to change between a low level and a high level periodically by the output of the microcomputer. When changeover signal 39 is at a low level, the temperature in the freezer compartment is detected with high resolution. When changeover signal 39 is at a high level, a continuity or disconnection failure of temperature sensor 49 can be detected.

As is well known from the above description, in this embodiment, since the reference voltage input terminal $V_{AREF}$ is directly connected to DC power supply Vc and the reference voltage input terminal $V_{ASS}$ is connected to the ground line through a parallel circuit employing resistor 43 and transistor 45, the range of analog input voltages for which A/D conversion is carried out can be changed by turning ON or turning OFF transistor 45. Therefore, the desired high resolution of temperature can be obtained even with an inexpensive A/D converter using a small bit number when transistor 45 is turned OFF. Furthermore, the failure of temperature sensor 49, such as a continuity failure or a disconnection failure, can be detected when transistor 45 is turned ON.

The present invention has been described with respect to a specific embodiment. However, other embodiments based on the principles of the present invention should be obvious to those of ordinary skill in the art. For example, in place of transistor 45, a mechanical switching element such as a relay contact may be used. Moreover, it is also possible for reference voltage input terminal $V_{AREF}$ to be connected to the DC power supply Vc through a parallel circuit of a resistor and a switching element such as a transistor, while the other reference voltage input terminal $V_{ASS}$ may be directly connected to ground. Furthermore, the parallel circuit of a resistor and a switching element such as a transistor may be connected between the reference voltage input terminal $V_{AREF}$ and $V_{ASS}$. The function of counter 15 could be realized by the microcomputer. Such embodiments are intended to be covered by the claims.

What is claimed is:

1. A temperature detector comprising:
   temperature sensing means for generating an analog voltage corresponding to a detected temperature;
   means for selecting one of a plurality of reference voltage ranges, the selecting means including switching means for selecting a reference voltage range which includes an analog voltage generated by the temperature sensing means when a failure has occurred in the temperature sensing means; and
   A/D conversion means for outputting digital data corresponding to the analog voltage from the temperature sensing means by comparing the analog voltage with the reference voltage range selected by the selecting means.

2. A temperature detector according to claim 1, wherein the A/D conversion means includes two input terminals to which an upper limit and a lower limit of a reference voltage range is input, respectively.

3. A temperature detector according to claim 2, wherein the selecting means includes a plurality of resistors connected between a DC power supply and ground, the upper limit input terminal of the A/D conversion means and the lower limit input terminal of the A/D conversion means being connected to different locations along the resistors, at least one of the resistors being short-circuited by the switching means.

4. A temperature detector according to claim 3, wherein the switching means includes a transistor turned ON and OFF sequentially with a period of predetermined time by a control signal input thereto.

5. A temperature detector according to claim 2, wherein the selecting means includes a plurality of resistors connected between a DC power supply and ground, the upper limit input terminal of the A/D conversion means being connected to the DC power supply and the lower limit input terminal of the A/D conversion means being connected to ground through at least one of the resistors, at least one of the resistors being short-circuited by the switching means.

6. A temperature detector according to claim 5, wherein the switching means includes a transistor turned ON and OFF sequentially with a period of predetermined time by a control signal input thereto.

7. A temperature detector according to claim 2, wherein the A/D conversion means includes:
   counter means for outputting a digital signal in accordance with a clock signal input thereto;
   decoder means for outputting a series of selection signals in accordance with the digital signal;
   means for generating a reference voltage within a reference voltage range selected by the selecting means in accordance with each of the selection signals; and
   means for comparing the input analog voltage with each of the generated reference voltages, the counter means being stopped and the digital signal being output as the digital data in response to the comparing means.

8. A temperature detector according to claim 7, wherein the reference voltage generating means includes a voltage dividing circuit employing resistors connected in series between the two input terminals and switches to make the reference voltage vary stepwise in accordance with the selection signal, the switches being connected to the connection points of the resistors, respectively.

9. A method for changing a resolution of a temperature detector comprising the steps of:
   setting a voltage range within which a reference voltage varies;
   comparing an input analog voltage corresponding to a detected temperature with the reference voltage as it varies within the set range and generating a digital data corresponding to the analog voltage with an A/D converter; and
   periodically shifting the set voltage range to another voltage range in order to detect a failure in the temperature detector.

* * * * *